United States Patent
Gray et al.

(10) Patent No.: US 11,413,542 B2
(45) Date of Patent: Aug. 16, 2022

(54) SYSTEMS AND METHODS FOR MEASURING AND OPTIMIZING THE VISUAL QUALITY OF A VIDEO GAME APPLICATION

(71) Applicant: DELL PRODUCTS L.P., Round Rock, TX (US)

(72) Inventors: Justin A. Gray, Grand Rapids, MI (US); Farzad Khosrowpour, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 281 days.

(21) Appl. No.: 16/862,328

(22) Filed: Apr. 29, 2020

(65) Prior Publication Data

US 2021/0339144 A1 Nov. 4, 2021

(51) Int. Cl.
| | | |
|---|---|---|
| *A63F 13/00* | (2014.01) | |
| *A63F 13/77* | (2014.01) | |
| *G06F 9/445* | (2018.01) | |
| *A63F 13/25* | (2014.01) | |
| *G09G 5/391* | (2006.01) | |
| *G06T 1/20* | (2006.01) | |

(52) U.S. Cl.
CPC ............ *A63F 13/77* (2014.09); *A63F 13/25* (2014.09); *G06F 9/4451* (2013.01); *G09G 5/391* (2013.01); *A63F 2300/552* (2013.01); *G06T 1/20* (2013.01); *G09G 2354/00* (2013.01)

(58) Field of Classification Search
None
See application file for complete search history.

(56) References Cited

U.S. PATENT DOCUMENTS

| | | | | |
|---|---|---|---|---|
| 5,218,431 | A | * | 6/1993 | Gleicher ............ H04N 11/042 348/415.1 |
| 8,512,140 | B1 | * | 8/2013 | Omi ..................... A63F 13/00 463/33 |
| 10,878,770 | B2 | * | 12/2020 | Spitzer ................. G09G 5/003 |

(Continued)

OTHER PUBLICATIONS

Wilson, "8 Nvidia GeForce Experience Tips For PC Gaming Excellence", PC Magazine, Mar. 2018, 15 pgs.

(Continued)

*Primary Examiner* — Paul A D'Agostino
(74) *Attorney, Agent, or Firm* — Egan, Enders & Huston LLP

(57) ABSTRACT

Systems and methods are disclosed herein that allow an information handling system (IHS) to determine the best visual quality for a video game application. In one embodiment, the disclosed systems and methods may determine optimal in-game settings for a video game application by assigning numerical values to the in-game settings, running a benchmark test using a first set of in-game settings having a first set of numerical values, monitoring the FPS generated during the benchmark test, combining the first set of numerical values and the monitored FPS into a game variable score, and incrementally changing the in-game settings and rerunning the benchmark test to generate new game variable scores. Once the monitored FPS reaches a target FPS, the set of in-game settings with the highest game variable score may be selected as the optimal in-game settings for the video game application.

21 Claims, 5 Drawing Sheets

(56) References Cited

U.S. PATENT DOCUMENTS

| | | | | |
|---|---|---|---|---|
| 2010/0080292 A1* | 4/2010 | Coulombe | ........... | H04N 19/152 375/E7.243 |
| 2012/0233105 A1* | 9/2012 | Cavallaro | ............... | A63F 13/46 703/3 |
| 2013/0017889 A1* | 1/2013 | Kozlov | ................. | A63F 13/355 463/42 |
| 2014/0011581 A1* | 1/2014 | Spitzer | .................... | A63F 13/77 463/29 |
| 2015/0029222 A1* | 1/2015 | Hofmann | .................. | G06T 7/74 382/103 |
| 2015/0154934 A1* | 6/2015 | Spitzer | ...................... | G06F 3/03 345/618 |
| 2016/0110841 A1* | 4/2016 | Kamiyama | ...... | H04N 21/25435 345/503 |
| 2016/0230265 A1* | 8/2016 | Darwish | ................. | C23C 14/28 |
| 2016/0250556 A1* | 9/2016 | Nomura | .................. | A63F 13/86 463/29 |
| 2016/0291989 A1* | 10/2016 | Spitzer | ................ | G06F 9/44505 |
| 2016/0323336 A1* | 11/2016 | Spitzer | ................ | H04L 65/4069 |
| 2016/0335743 A1* | 11/2016 | Konstantinov | ..... | G06F 3/04847 |
| 2017/0330496 A1* | 11/2017 | Oravainen | ........... | G06T 3/4092 |
| 2017/0370683 A1* | 12/2017 | Ghani | ................... | A63F 13/837 |
| 2018/0332252 A1* | 11/2018 | Wang | .................... | G09G 5/005 |
| 2019/0394253 A1* | 12/2019 | Gharbi | ................. | H04L 65/607 |
| 2021/0346805 A1* | 11/2021 | Daniali | ................. | A63F 13/332 |

OTHER PUBLICATIONS

Smith, "AMD Discontinues Gaming Evolved App", Anantech.com, Oct. 2016, 2 pgs.

Chacos, "AMD Quietly Scuttles Gaming Evolved, The Radeon Rival To GeForce Experience", PCWorld, Oct. 2016, 3 pgs.

AMD, "AMD Adrenalin 2019 Update: The Top Three Features To Try Right Now", Captured from Internet on Dec. 21, 2018, 73 pgs.

AMD, "Radeon Software Adrenalin 2019 Edition Release Notes", Captured from Internet on Aug. 5, 2019, 11 pgs.

\* cited by examiner

SYSTEMS AND METHODS FOR MEASURING AND OPTIMIZING THE VISUAL QUALITY OF A VIDEO GAME APPLICATION

FIELD

This invention relates generally to information handling systems and, more particularly, to video game applications executed by information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Video game applications can be run or executed on many different types of information handling systems including desktop computers, laptop computers, tablet computers, smart phones and dedicated gaming consoles. Each of these systems may have different hardware and software configurations, which may affect the visual quality of a video game application.

Frame rate is one of the most common benchmarks used to measure the visual quality of a video game application. The frame rate reflects how often an image displayed on a screen is refreshed to produce the image and simulate movement/motion, and is most often measured in frames per second (FPS). Common FPS for video game applications include 30, 60, 100 and 144 FPS. There are many factors involved in determining a particular game's frame rate, but as with many things in technology, the higher or faster something is, the better. In general, high frame rates (e.g., 60 FPS and above) tend to provide smooth gameplay, while low frame rates (e.g., 30 FPS) may cause a number of undesirable issues, such as choppy or jumpy movement during action sequences that involve a lot of movement (or animations), frozen screens that make it difficult to interact with the game, etc.

There are a number of factors that contribute to, and affect, the frame rate (or FPS) performance of a particular video game application. These include, but are not limited to, the hardware included within the system (such as, for example, the GPU, CPU, system motherboard and memory), the graphics and resolution settings specified for the video game application (i.e., the in-game settings), and how well the video game application program code is optimized and developed for graphics performance.

The largest contributing factor to a game's frame rate (or FPS) performance is typically the GPU and the CPU. The CPU sends instructions from the video game application to the GPU, which in turn, processes the instructions, renders the images, and sends the rendered images to the monitor for display. The processing power and performance of the CPU and GPU directly impact the frame rate, or FPS, of the video game application. The monitor (or other display device) is another example of system hardware that can impact the FPS of the video game application. Many LCD monitors, for example, are set with a refresh rate of 60 Hz. If images are rendered above 60 FPS, they will not be visible on such devices.

The graphics and resolution settings within a video game application (i.e., the in-game settings) also impact the frame rate or FPS of the video game application. Examples of in-game settings include, but are not limited to, lighting/shadows, textures, resolution, antialiasing (AA), anisotropic filtering (AF), field of view, foliage, etc. The more in-game settings are set toward the higher end of the scale, the more load is placed on the GPU, requiring more memory and processing power. In some cases, the load placed on the GPU may cause the FPS to decrease and result in poor game performance. The FPS may also vary over time throughout a gaming session, based on the hardware configuration of the system and what is currently happening within the game. For example, graphics intense action sequences may impact the game's FPS due to a large number of moving objects, game physics and calculations, 3D environments and more.

One known method to improve the frame rate (FPS) and overall performance of a video game application is to adjust the in-game settings. Although performance can be improved by lowering all of the in-game settings, most video game users prefer to achieve a balance between performance and appearance (i.e., visual quality) in their gaming experience.

In some cases, a video game user may attempt to find the best visual quality for a particular video game application by using operating system (OS) layer tools to manually adjust one or more in-game settings using a trial and error approach. However, it is difficult for a video game user to determine the visual impact that a particular in-game setting makes in comparison to other in-game settings. In some cases, users may have to guess what each in-game setting means in terms of visual quality, and may simply choose a group of settings that the user has used in the past. Users looking for the best visual quality and performance often find themselves with an impossible task, which typically ends with the user settling on an acceptable mean, instead of achieving the best gaming experience.

In addition to manual adjustment, some video game applications provide an "auto setting," which detects the CPU and GPU included within the system and attempts to match the detected CPU/GPU to a best guess group of in-game settings. However, this "auto setting" does not account for other differences in system configuration that may affect the visual quality of a video game application, or changes in FPS that may occur throughout the game.

SUMMARY

Systems and methods are disclosed herein that allow an information handling system (IHS) to determine the best visual quality for a video game application being executed by the IHS, or by another IHS remotely coupled to the IHS.

In one embodiment, the disclosed systems and methods may determine optimal in-game settings for a video game application by assigning numerical values to in-game settings, running a benchmark test using a first set of in-game settings having a first set of numerical values, monitoring the FPS generated during the benchmark test, combining the first set of numerical values and the monitored FPS into a game variable score, incrementally changing the in-game settings and rerunning the benchmark test to generate a new game variable score. Once the monitored FPS reaches a target FPS, the set of in-game settings with the highest game variable score may be selected as the optimal in-game settings for the video game application. By determining a relationship between individual in-game settings and FPS, the systems and methods disclosed herein provide a quantitative and systematic means to measure the visual quality of a video game application and optimize in-game settings.

According to one embodiment, a computer-implemented method to determine optimal in-game settings for a video game application is provided herein. The computer-implemented method may be performed by a processing device of an information handling system (IHS) that executes the video game application, or by another IHS remotely coupled to the IHS. The computer-implemented method may generally include detecting a target frames-per-second (FPS) selected for the video game application, determining in-game settings associated with the video game application, and determining the optimal in-game settings for the video game application and the target FPS. Each in-game setting associated with the video game application includes a range of in-game setting values. For each in-game setting, the computer-implemented method further includes dividing the range of in-game setting values into a plurality of subsets ranging from a lowest subset to a highest subset, and beginning with the lowest subset, assigning an increasingly greater numerical value to each subsequent subset. In some embodiments, the computer-implemented method further includes applying the optimal in-game settings to the video game application.

In some embodiments, determining the optimal in-game settings for the video game application and the target FPS includes: applying one subset of each of the in-game settings to the video game application; monitoring the frames-per-second (FPS) generated during execution of the video game application; combining the generated FPS and the numerical values assigned to the applied subsets of in-game settings into a game variable score for the applied subsets of in-game settings, and storing the applied subsets of in-game settings, the generated FPS and the game variable score in a local database. In one embodiment, a median subset of each of the in-game settings may be initially applied to the video game application in said applying. In one embodiment, the game variable score may be calculated by multiplying the generated FPS with a summation of the numerical values assigned to the applied subsets of the in-game settings.

In some embodiments, determining the optimal in-game settings for the video game application and the target FPS includes: comparing the generated FPS to the target FPS; adjusting the applied subsets of in-game settings by increasing one in-game setting to the subset having the next highest numerical value, if the generated FPS is greater than the target FPS; and adjusting the applied subsets of in-game settings by decreasing one in-game setting to the subset having the next lowest numerical value, if the generated FPS is less than the target FPS. If the applied subsets of in-game settings are adjusted, determining the optimal in-game settings for the video game application and the target FPS may further include: applying the adjusted subsets of the in-game settings to the video game application; and repeating the steps of monitoring, combining, storing and comparing until the generated FPS equals the target FPS.

In some embodiments, determining the optimal in-game settings for the video game application and the target FPS further includes determining the optimal in-game settings for the video game application and the target FPS by selecting, from the local database, the in-game settings associated with the highest game variable score.

According to another embodiment, a computer-implemented method to optimize the visual quality of a video game application during a gaming session is provided herein. The computer-implemented method may be performed by a processing device of an information handling system (IHS) that executes the video game application. The computer-implemented method may generally include: detecting the beginning of a gaming session for the video game application; detecting a target frames-per-second (FPS) selected for the video game application; determining optimal in-game settings for the video game application and the target FPS; applying the optimal in-game settings to the video game application; monitoring the FPS generated during the gaming session; and comparing the generated FPS to the target FPS.

If the generated FPS is less than the target FPS, the computer-implemented method may further include: adjusting each setting of the applied in-game settings, one setting at a time, until the generated FPS equals the target FPS to optimize the visual quality of the video game application during the gaming session. After adjusting each setting of the applied in-game settings, the computer-implemented method may further include: storing the adjusted in-game settings in a local database; applying the adjusted in-game settings to the video game application; and repeating the steps of monitoring and comparing until the gaming session ends.

In some embodiments, determining the optimal in-game settings for the video game application and the target FPS may include: accessing a local database storing a plurality of game variable scores, wherein each game variable score is associated with a different set of in-game settings and the FPS generated when the different set of in-game settings was previously applied to the video game application; and selecting, from the local database, the set of in-game settings associated with the highest game variable score.

According to another embodiment, an information handling system (IHS) is provided herein comprising a computer readable medium and a processing device coupled to the computer readable medium. In some embodiments, the computer readable medium may be configured to store a first set of program instructions, which are executable by the processing device to determine optimal in-game settings for a video game application executed by the IHS, or another IHS remotely coupled to the IHS. In other embodiments, the computer readable medium may be configured to store a second set of program instructions executable, which are executable by the processing device to optimize the visual quality of the video game application during a gaming session.

In some embodiments, the processing device may execute the first set of program instructions to: detect a target frames-per-second (FPS) selected for the video game application; determine in-game settings associated with the video game application; and determine the optimal in-game settings for the video game application and the target FPS. Each in-game setting associated with the video game application includes a range of in-game setting values. For each in-game setting, the range of in-game setting values are divided into a plurality of subsets ranging from a lowest subset to a highest subset, and beginning with the lowest subset, an increasingly greater numerical value is assigned to each subsequent subset.

In order to determine the optimal in-game settings for the video game application and the target FPS, the processing device may execute the first set of program instructions to: apply one subset of each of the in-game settings to the video game application; monitor the frames-per-second (FPS) generated during execution of the video game application; combine the generated FPS and the numerical values assigned to the applied subsets of in-game settings into a game variable score for the applied subsets of in-game settings; and store the applied subsets of in-game settings, the generated FPS and the game variable score in a local database.

In some embodiments, the processing device may execute the first set of program instructions to: compare the generated FPS to the target FPS, adjust the applied subsets of in-game settings by increasing one in-game setting to the subset having the next highest numerical value. if the generated FPS is greater than the target FPS; and adjust the applied subsets of in-game settings by decreasing one in-game setting to the subset having the next lowest numerical value, if the generated FPS is less than the target FPS. If the applied subsets of in-game settings are adjusted, the processing device may execute the first set of program instructions to: apply the adjusted subsets of the in-game settings to the video game application; and repeat said monitoring, combining, storing and comparing until the generated FPS equals the target FPS.

In some embodiments, the processing device may execute the first set of program instructions to determine the optimal in-game settings for the video game application and the target FPS by selecting, from the local database, the in-game settings associated with the highest game variable score.

In some embodiments, the first set of program instructions may be executed by the processing device before, during or after a video game user begins a gaming session with the video game application.

In some embodiments, the processing device may execute the second set of program instructions to: detect the beginning of a gaming session for the video game application; detect the target FPS selected for the video game application; determine the optimal in-game settings for the video game application and the target FPS; apply the optimal in-game settings to the video game application; monitor the FPS generated during the gaming session; and compare the generated FPS to the target FPS. In order to determine the optimal in-game settings for the video game application and the target FPS, the processing device may in some embodiments execute the second set of program instructions to: access a local database storing a plurality of game variable scores, wherein each game variable score is associated with a different set of in-game settings and the FPS generated when the different set of in-game settings was previously applied to the video game application; and select, from the local database, the set of in-game settings associated with the highest game variable score.

If the generated FPS is less than the target FPS, the processing device may execute the second set of program instructions to adjust each setting of the applied in-game settings, one setting at a time, until the generated FPS equals the target FPS to optimize the visual quality of the video game application during the gaming session. After adjusting each setting of the applied in-game settings, the processing device may execute the second set of program instructions to: store the adjusted in-game settings in a local database; apply the adjusted in-game settings to the video game application; and repeat said monitoring and comparing until the gaming session ends.

BRIEF DESCRIPTION OF THE DRAWINGS

Other advantages of the present disclosure will become apparent upon reading the following detailed description and upon reference to the accompanying drawings in which.

Figure 1:
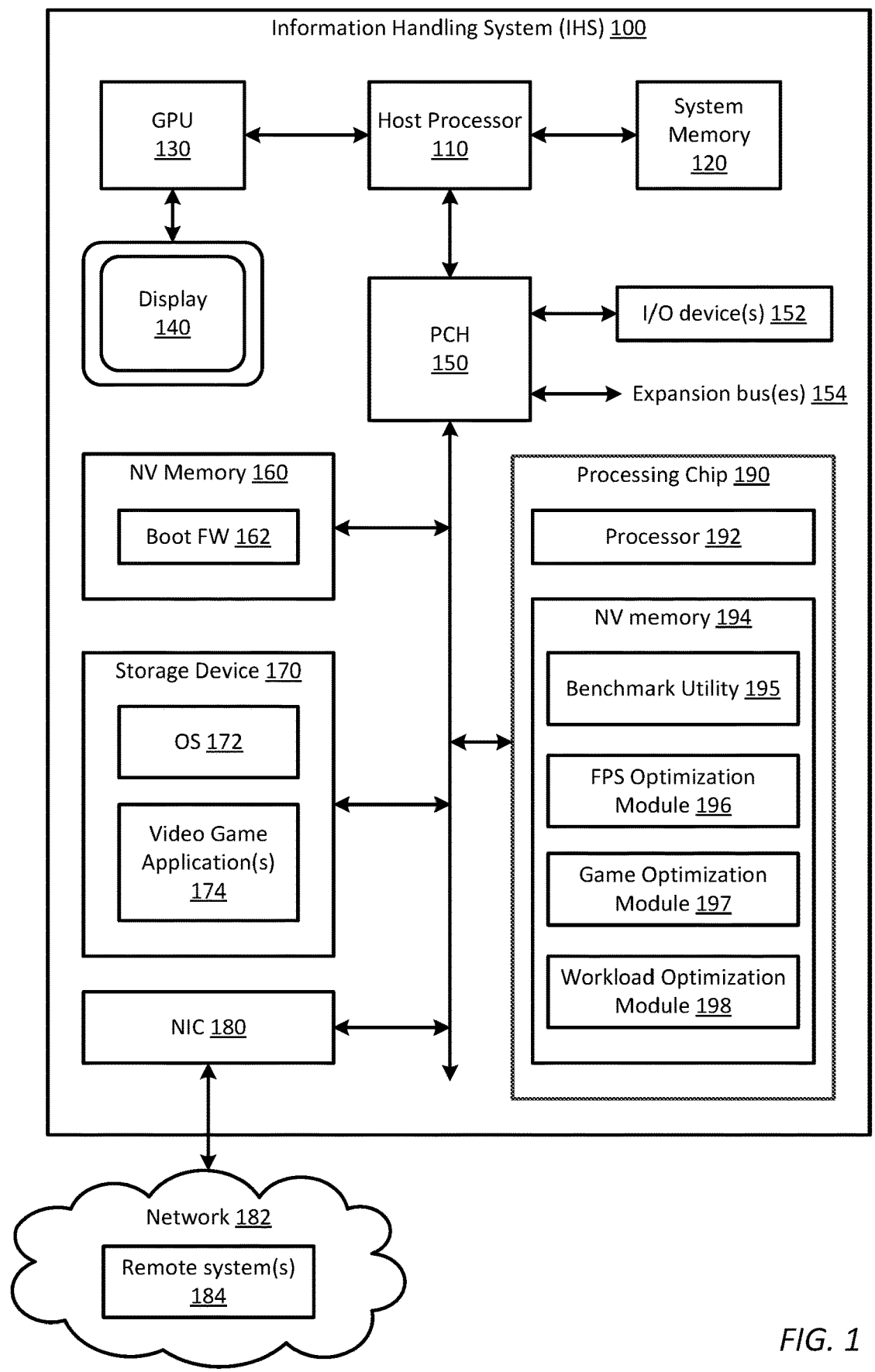
FIG. 1 is a block diagram illustrating one embodiment of an information handling system (IHS) in accordance with the present disclosure.

While the present disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the present disclosure is to cover all modifications, equivalents and alternatives falling within the spirit and scope of the present disclosure as defined by the appended claims.

DESCRIPTION OF ILLUSTRATIVE EMBODIMENTS

Information handling systems (IHSs) and methods are provided herein for determining and optimizing the visual quality of a video game application (otherwise referred to as a "video game" or simply a "game"). The methods described herein may be implemented on a wide variety of information handling systems including, but not limited to, desktop computers, laptop computers, tablet computers, smart phones, dedicated gaming consoles, servers, etc. In some embodiments, the methods disclose herein may be implemented as computer program instructions, which are executed locally on an IHS on which a video game application is executed or run. In other embodiments, computer program instructions corresponding to the disclosed methods may be executed by another IHS, which is remotely coupled to the IHS running the video game application.

In one embodiment, the systems and methods disclosed herein may determine and optimize the visual quality of a video game application by monitoring the frames per second (FPS) generated during execution of the video game application, comparing the monitored FPS to a target FPS, and adjusting one or more in-game settings of the video game application, if the monitored FPS is less than the target FPS. In some embodiments, optimal in-game settings for a particular video game application and a particular IHS may be determined before, during or after a video game user (or simply "user") begins a gaming session with the video game application.

In some embodiments, optimal in-game settings may be determined by assigning numerical values to the in-game settings, running a benchmark test using a first set of in-game settings having a first set of numerical values, monitoring the FPS generated during the benchmark test, combining the first set of numerical values and the monitored FPS into a game variable score, and incrementally changing the in-game settings and rerunning the benchmark test to generate new game variable scores. Once the monitored FPS reaches a target FPS, the set of in-game settings with the highest game variable score may be selected as the optimal in-game settings. By determining a relationship between individual in-game settings and FPS, the systems and methods disclosed herein provide a quantitative and systematic means to measure the visual quality of a video game application and optimize in-game settings. Unlike conventional methods, the determination of visual quality and optimization of in-game settings is not based on the subjective perceptions of the video game user or limited to "auto settings," which detect the CPU and GPU included within a system and attempt to match the detected CPU/GPU to a best guess group of in-game settings.

FIG. 1 is a block diagram of an information handling system 100 (e.g., a desktop computer, laptop computer, tablet computer, smart phone, dedicated gaming console, server, etc.) as it may be configured according to one embodiment of the present disclosure. As shown in FIG. 1, IHS 100 may generally include at least one processing device (e.g., a host processor) 110, a system memory 120, a graphics processor unit (GPU) 130, a display device 140, a platform controller hub (PCH) 150, input/output (I/O) devices 152, expansion bus(es) 154, a computer readable non-volatile (NV) memory 160, a computer readable storage device 170, and a network interface card (NIC) 180. In some embodiments, IHS 100 may further include a dedicated processing chip 190, which may be used to perform the functionality described herein. In other embodiments, the dedicated processing chip 190 shown in FIG. 1 may be omitted, and the disclosed functionality may be performed by other system components (e.g., host processor 110, system memory 120, GPU 130, NV memory 160 and/or storage device 170), or by a remote system coupled to IHS 100.

It is expressly noted that the IHS configuration shown in FIG. 1 is exemplary only, and that the methods disclosed herein may be implemented on any type and/or configuration of information handling system having one or more processing devices, computer readable memory, and/or a computer readable storage device. It will be further understood that while certain components of the information handling system are shown in FIG. 1 for illustrating embodiments of the present disclosure, the information handling system disclosed herein is not restricted to including only those components shown in FIG. 1 and described below.

Host processor 110 may include various types of programmable integrated circuits (e.g., a processor such as a controller, microcontroller, microprocessor, ASIC, etc.) and programmable logic devices (such as a field programmable gate array "FPGA", complex programmable logic device "CPLD", etc.). According to one embodiment, host processor 110 may include at least one central processing unit (CPU) having one or more processing cores. The CPU may include any type of processing device, such as an Intel Pentium series processor, an Advanced Micro Devices (AMD) processor or another processing device.

System memory 120 is coupled to host processor 110 and generally configured to store program instructions (or computer program code), which are executable by host processor 110. System memory 120 may be implemented using any suitable memory technology, including but not limited to, random access memory (RAM), static RAM (SRAM), dynamic RAM (DRAM), synchronous dynamic RAM (SDRAM), non-volatile RAM (NVRAM), erasable programmable ROM (EPROM), electrically erasable programmable ROM (EEPROM), Flash memory, or any other type of volatile memory.

Graphics processor unit (GPU) 130 is coupled to host processor 110 and configured to coordinate communication between the host processor and one or more display components of the IHS. In the embodiment shown in FIG. 1, GPU 130 is coupled to display device 140 and configured to provide visual images (e.g., images, messages, user prompts and/or graphical user interfaces associated with a video game application) to a user. Although GPU 130 is shown as a separate processing device in the embodiment of FIG. 1, GPU 130 may be omitted in other embodiments, when the functionality provided thereby is integrated within host processor 110 in a system-on-chip (SoC) design. In some embodiments, GPU 130 may be a graphics-derivative processor, such as a physics/gaming processor. In some embodiments, IHS 100 may include other types of processing devices, such as a digital signal processor (DSP), an integrated graphics processing unit (iGPU), an Electronic Lighting Control Chip (ELC), etc.

Platform controller hub (PCH) 150 is coupled to host processor 110 and configured to handle I/O operations for the IHS. As such, PCH 150 may include a variety of communication interfaces and ports for communicating with various system components, such as input/output (I/O) devices 152, expansion bus(es) 154, computer readable NV memory 160, computer readable storage device 170, NIC 180 and dedicated processing chip 190. Examples of communication interfaces and ports that may be included within PCH 150 include, but are not limited to, a Peripheral Component Interconnect (PCI) interface, a PCI-Express (PCIe) interface, a Serial Peripheral Interface (SPI), an Enhanced SPI (eSPI), a Serial AT Attachment (SATA) interface, a Low Pin Count (LPC) interface, a Small Computer Serial Interface (SCSI), an Industry Standard Architecture (ISA) interface, an Inter-Integrated Circuit (I2C) interface, a Universal Serial Bus (USB) interface and a Thunderbolt™ interface. Examples of expansion bus(es) 154 that may be coupled to PCH 150 include, but are not limited to, a PCI bus, a PCIe bus, a SATA bus, a USB bus, etc.

I/O devices 152 enable the user to interact with IHS 100 and software/firmware executing thereon. In some embodiments, one or more I/O devices 152 may be provided within IHS 100. In other embodiments, I/O device(s) 152 may be separate from the IHS and may interact with the IHS through a wired or wireless connection. Examples of I/O devices 152 include, but are not limited to, keyboards, keypads, joysticks and other video game controllers, touch screens, mice, scanning devices, voice or optical recognition devices, and any other devices suitable for entering or retrieving data. In some embodiments, a video game user may utilize an I/O device 152 to select a target FPS for a particular video game application and/or to run a benchmark test to determine optimal in-game settings for a particular video game application.

Computer readable memory 160 may include any type of non-volatile (NV) memory including, but not limited to, Flash memory (e.g., SPI Flash memory) and non-volatile random-access memory (NVRAM), and may be generally configured to store software and/or firmware modules, which may be executed by host processor 110 to instruct components of IHS 100 to perform various tasks and functions for the information handling system. In the embodiment shown in FIG. 1, computer readable NV memory 160 stores boot firmware (FW) 162 in addition to other firmware modules (not shown). Boot firmware 162 may be implemented as a Basic Input/Output System (BIOS) and/or a Unified Extensible Firmware Interface (UEFI). As known in the art, boot firmware 162 includes software and/or firmware modules for specifying hardware configuration settings, system date/time, boot sequence, etc.

Computer readable storage device 170 may include any type of persistent, non-transitory computer readable storage device, such as one or more hard disk drives (HDDs) or solid-state drives (SSDs), and may be generally configured to store software and/or data. For example, computer readable storage device 170 may be configured to store an operating system (OS) 172 for the IHS, in addition to other software and/or firmware modules and user data. As known in the art, OS 172 may contain program instructions (or computer program code), which may be executed by host processor 110 to perform various tasks and functions for the information handling system and/or for the user. In some embodiments, one or more video game applications 174 may also be stored within computer readable storage device 170, as shown in FIG. 1. In other embodiments, video game application(s) may be stored remotely (e.g., on a remote system 184) and accessed via a network 182, such as the Internet. In other embodiments, video game application(s) may be stored on a disc, which may be read by an optical disc drive (not shown) included within the IHS 100.

Regardless of where a video game application is stored, program instructions (or computer program code) associated with the video game application may be executed by host processor 110 and GPU 130. As noted above, the host processor (or CPU) 110 may send instructions from the video game application to the GPU 130, which processes the instructions, renders the images, and sends the rendered images to the display device 140. The frame rate (or FPS) at which the rendered images are sent to the display device 140 may depend on the capabilities of the host processor 110 and GPU 130, the video game application program code, and the in-game settings specified for the video game application. As noted above, the frame rate (or FPS) of a video game application may be used as a benchmark to measure the visual quality of the video game application, and often changes over the course of a gaming session.

NIC 180 enables IHS 100 to communicate with one or more remotely located systems and/or services 184 via an external network 182 using one or more communication protocols. Network 182 may be a local area network (LAN), wide area network (WAN), personal area network (PAN), or the like, and the connection to and/or between IHS 100 and network 182 may be wired, wireless or a combination thereof. For purposes of this discussion, network 182 is indicated as a single collective component for simplicity. However, it is appreciated that network 182 may comprise one or more direct connections to other remote systems and/or services, as well as a more complex set of interconnections as can exist within a wide area network, such as the Internet. NIC 180 may communicate data and signals to/from IHS 100 using any known communication protocol.

In some embodiments, IHS 100 may utilize NIC 180 to access a remotely located system 184 (e.g., a network connected server, or server cloud). In some embodiments, the remotely located system 184 may store video game application(s), which can be executed by the host processor 110 and GPU 130 of IHS 100. In other embodiments, the remotely located system 184 may store software and/or firmware modules, which may be executed by the remotely located system to measure and/or track the visual quality of a video game application executed by IHS 100.

In some embodiments, IHS 100 may include a dedicated processing chip 190 to measure and optimize the visual quality of a video game application executed by the IHS. In the embodiment shown in FIG. 1, for example, dedicated processing chip 190 includes a processor 192 and a computer readable NV memory 194 containing software and/or firmware modules (e.g., benchmark utility 195, FPS optimization module 196, game optimization module 197 and workload optimization module 198), which may be executed by the processor 192 to measure and optimize the visual quality of a video game application.

When included within IHS 100, dedicated processing chip 190 may have direct pathways to host processor 110, system memory 120, GPU 130, NV memory 160, storage device 170 and/or NIC 180, and may offload processing of benchmark data and optimizations from the host processor to the chip. In some embodiments, dedicated processing chip 190 may access one or more additional processors (e.g., an iGPU or ELE), when needed, for extra processing power. In other embodiments, dedicated processing chip 190 may collect and send benchmark data to a remotely located system 184, instead of processing the benchmark data locally. In some embodiments, the remotely located system 184 may process the benchmark data received from IHS 100 for a particular video game application, and may compare the benchmark data received from the IHS 100 to benchmark data received from other information handling systems. In other embodiments, dedicated processing chip 190 may be omitted from IHS 100. In such embodiments, the functionality described herein for the dedicated processing chip 190 may, instead, be performed locally by host processor 110 or remotely by a remotely located system 184.

Each video game application has its own in-game settings (e.g., lighting/shadows, textures, resolution, antialiasing (AA), anisotropic filtering (AF), field of view, foliage, etc.), its own engine, and its own application program interface (API). In addition, each video game application has its own set of system optimization settings for different central processing units (CPUs), graphics processing units (GPUs), and internal calls. When optimization settings for a particular IHS are paired with in-game settings, the number of possible permutations of settings (i.e., system optimization settings and in-game settings) that affect the visual quality of a video game application can easily reach into the trillions. This makes it extremely difficult, if not impossible, for a video game user to determine the optimal in-game settings to use for each video game application run on their system.

To overcome this problem, the present disclosure provides a benchmark utility 195 and a plurality of optimization modules (e.g., FPS optimization module 196, game optimization module 197 and workload optimization module 198), which can be used to quantitatively and systematically measure the visual quality of a video game application executed by an IHS, and to determine the optimal in-game settings (i.e., the in-game settings that provide the best visual quality and FPS performance) for that video game application on that machine.

Figure 3A:
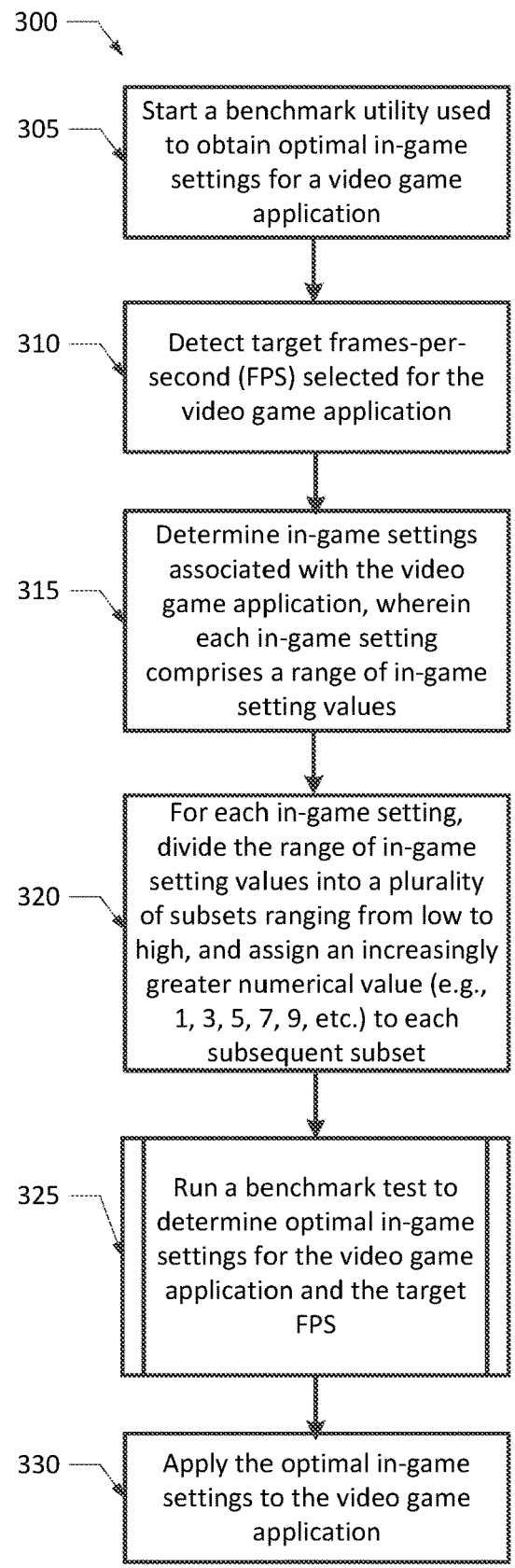
FIG. 3A is a flowchart diagram illustrating one embodiment of a method to determine optimal in-game settings for a video game application.
Figure 3B:
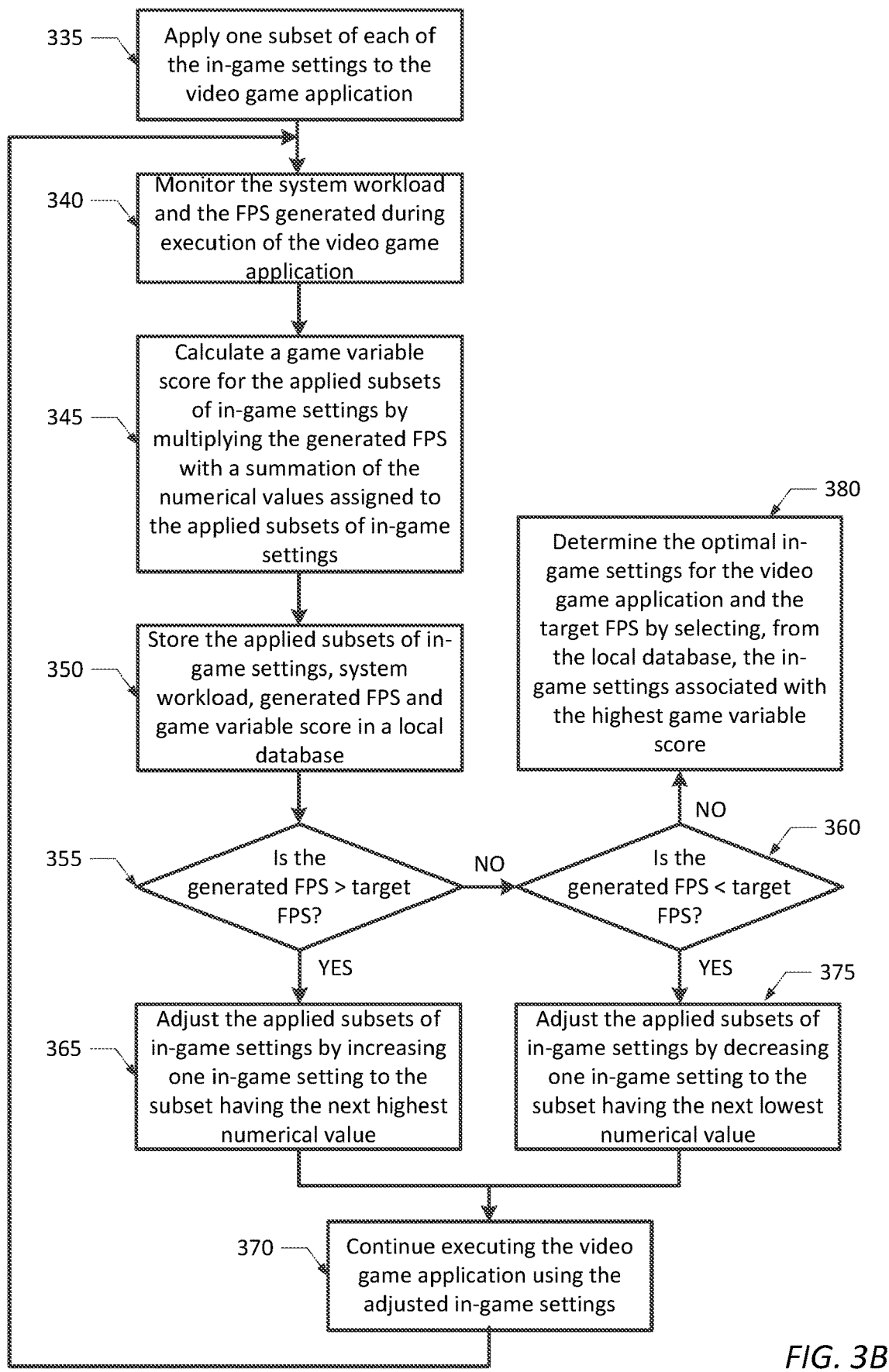
FIG. 3B is a flowchart diagram illustrating one embodiment of a benchmark test method to determine optimal in-game settings for a video game application.

Benchmark utility 195 may generally contain program instructions (or computer program code), which may be executed by a processing device (e.g., processor 192, host processor 110 or another local or remotely located processing device) to measure the visual quality of a video game application executed by an IHS, and to determine the optimal in-game settings for the video game application. The benchmark utility 195 may be run before or after a video game user begins a gaming session to measure visual quality and determine the optimal in-game settings for a particular video game application and a particular IHS. One manner in which the benchmark utility 195 may be used to measure visual quality and determine optimal in-game settings is shown in FIGS. 3A and 3B and described in more detail below.

As discussed in more detail below, benchmark utility 195 may determine optimal in-game settings for a particular video game application and a particular IHS by assigning numerical values to the in-game settings, running a benchmark test using a first set of in-game settings having a first set of numerical values, monitoring the FPS generated during the benchmark test, combining the first set of numerical values and the monitored FPS into a game variable score, incrementally changing the in-game settings and rerunning the benchmark test to generate a new game variable score. Once the monitored FPS reaches a target FPS, the set of in-game settings with the highest game variable score may be selected as the optimal in-game settings for the particular video game application and the particular IHS. By determining a relationship between individual in-game settings and FPS, benchmark utility 195 provides a quantitative and systematic method to measure the visual quality of a video game application and to optimize the in-game settings used for that video game application run on that IHS.

Figure 2:
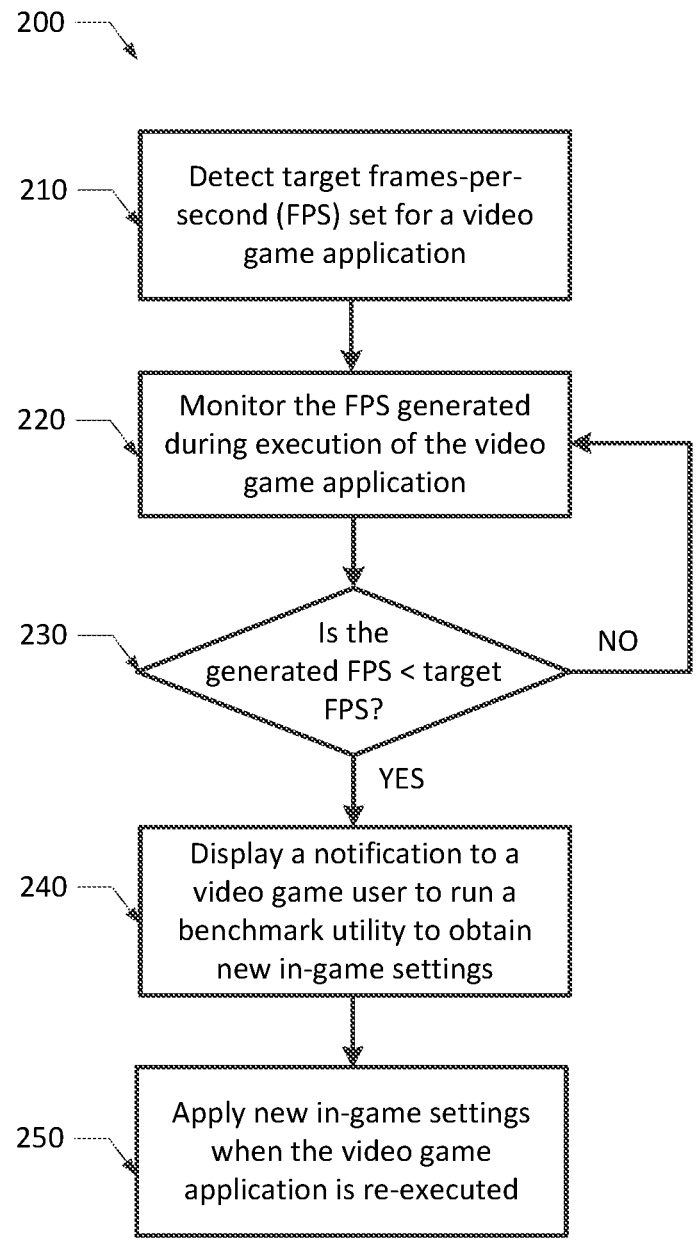
FIG. 2 is a flowchart diagram illustrating one embodiment of a method to set a target frames per second (FPS) for a video game application, and to monitor and optimize the FPS generated during execution of the video game application.

FPS optimization module 196 may generally contain program instructions (or computer program code), which may be executed by a processing device (e.g., processor 192, host processor 110 or another local or remotely located processing device) to set the target FPS for a video game application, and to monitor and optimize the FPS generated during execution of the video game application. The FPS optimization module 196 may be run before, during and/or after a video game user begins a gaming session with a particular video game application. One manner in which the FPS optimization module 196 may be used to set the target FPS and monitor and optimize the generated FPS is shown in FIG. 2 and described in more detail below.

Figure 4:
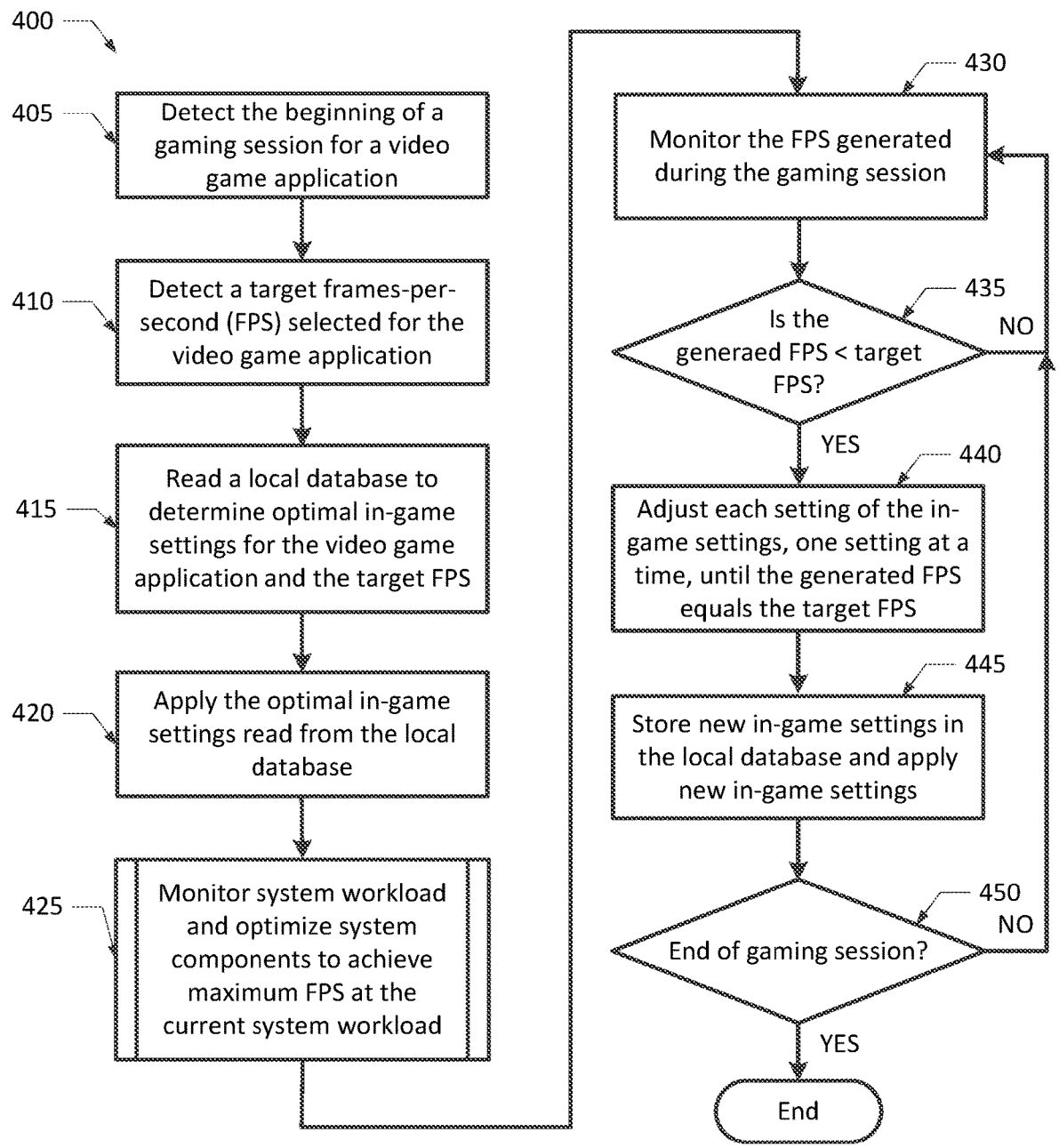
FIG. 4 is a flowchart diagram illustrating one embodiment of a method to optimize the visual quality of a video game application during a gaming session.

Game optimization module 197 may generally contain program instructions (or computer program code), which may be executed by a processing device (e.g., processor 192, host processor 110 or another local or remotely located processing device) to optimize the visual quality of a video game application during a gaming session. When a video game user begins a gaming session with a particular video game application, the game optimization module 197 applies the optimal in-game settings, which were previously determined by benchmark utility 195 for that video game application and that IHS. Over the course of the gaming session, the game optimization module 197 adjusts the applied in-game settings as changes occur in the system workload and/or the monitored FPS. One manner in which the game optimization module 197 may be used to adjust in-game settings over the course of a gaming session is shown in FIG. 4 and described in more detail below.

Workload optimization module 198 may generally contain program instructions (or computer program code), which may be executed by a processing device (e.g., processor 192, host processor 110 or another local or remotely located processing device) to monitor system workload and optimize system components to achieve a maximum FPS for a video game application at the current system workload. The workload optimization module 198 may be run before, during and/or after a video game user begins a gaming session with a particular video game application. In some embodiments, the system workload monitored by the workload optimization module 198 may be provided to benchmark utility 195 and recorded along with the applied in-game settings, the game variable score, and the monitored FPS in a local database. In some embodiments, the game optimization module 197 may utilize the workload optimization module 198 to further improve the visual quality of a video game application. For example, the game optimization module 197 may use the workload optimization module 198 to dynamically adjust operating characteristics of one or more system components (e.g., the CPU, GPU, monitor, RAM, network, power, fans, skin temperature, etc.) during a gaming session, so as to achieve a maximum FPS for the video game application at the current system workload.

The systems and methods disclosed herein allow an information handling system (IHS) to measure and optimize the visual quality of a video game application. More specifically, the disclosed systems and methods can be used to quantitatively and systematically measure the visual quality of a video game application executed by an IHS, and to determine the optimal in-game settings (i.e., the in-game settings that provide the best visual quality and FPS performance) for that video game application on that machine. Because the system creates a repeatable process, it can be used to create a large pool of benchmark data, which can be obtained from multiple systems for multiple video game applications and multiple in-game settings. By collecting a large pool of benchmark data, the system is able to understand small variances between different IHS configurations and compare those variances against in-game settings. In some embodiments, the disclosed system may use this large pool of benchmark data to approximate the visual quality of video game applications it has not yet measured.

By tying FPS and in-game settings into one value (i.e., a game variable score), the system is capable of understanding the relationship between individual in-game settings and FPS. This enables the system to approximate how a person (e.g., a video game user) would interpret the visual quality of the video game application. By providing a quantitative, systematic approach to determining and selecting optimal in-game settings, the system is capable of out-performance tuning a person.

FIGS. 2-4 illustrate example embodiments of methods in accordance with the present disclosure, which may be used to measure the visual quality of a video game application executed or run by an IHS, and to determine the optimal in-game settings (i.e., the in-game settings that provide the best visual quality and FPS performance) for that video game application on that machine. For example, FIG. 2 illustrates one embodiment of a method 200 that may be used to set a target FPS for a video game application, and to monitor and optimize the FPS generated during execution of the video game application. FIGS. 3A and 3B illustrate one embodiment of a method 300 that may be used to determine optimal in-game settings for a video game application. FIG. 4 illustrates one embodiment of a method 400 that may be used to optimize the visual quality of a video game application during a gaming session.

The methods 200, 300 and 400 shown in FIGS. 2-4 are computer implemented methods performed, at least in part, by a processing device (e.g., processor 192, host processor 110 or another local or remotely located processing device) of an information handling system (e.g., IHS 100 or a remotely located system 184) by executing program instructions (e.g., program instructions contained within benchmark utility 195, FPS optimization module 196, game optimization module 197 and/or workload optimization module 198) stored within a computer readable medium (e.g., NV memory 194, computer readable storage device 170, etc.). Unlike conventional methods for optimizing the visual quality of a video game application (e.g., "auto setting" features and user trial-and-error), the computer implemented methods 200, 300 and 400 shown in FIGS. 2-4 improve the way in which an information handling system (such as IHS 100) functions by providing a quantitative and systematic approach to measure the visual quality of a video game application and determine the optimal in-game settings for a given video game application run on a given information handling system.

FIG. 2 illustrates one embodiment of a method 200 that may be used to set a target FPS for a video game application, and to monitor and optimize the FPS generated during execution of the video game application. Although not strictly limited to such, the method 200 shown in FIG. 2 may be performed, in one embodiment, by a processing device executing program instructions contained within the FPS optimization module 196 shown, for example, in FIG. 1.

In one embodiment, method 200 may begin by detecting a target FPS set for a video game application (in step 210). In some embodiments, the target FPS may be set by a video game user by selecting the target FPS (e.g., 30, 60, 100, 144, etc.) from an in-game settings menu provided by the video game application. The target FPS selected by the video game user may be dependent on the video game application, as well as the capabilities of various hardware components (e.g., the CPU, GPU, monitor, etc.) included within the video game user's system. In other embodiments, a default target FPS may be set by the video game application based on hardware components (e.g., the CPU, GPU, monitor, etc.) detected by the video game application.

In steps 220 and 230, method 200 monitors the FPS generated during execution of the video game application until the monitored FPS drops below the target FPS. If the generated FPS is less than the target FPS (YES branch of step 230), method 200 displays a notification to the video game user, requesting the user to run a benchmark utility (e.g., benchmark utility 195 of FIG. 1) to obtain new in-game settings (in step 240). One embodiment of method steps associated with running the benchmark utility and obtaining new in-game settings is shown in FIGS. 3A and 3B and discussed in more detail below. After new in-game settings are obtained, the new in-game settings are applied when the video game application is re-executed (in step 250).

FIGS. 3A and 3B illustrate one embodiment of a method 300 that may be used to determine optimal in-game settings for a video game application. Although not strictly limited to such, the method 300 shown in FIGS. 3A and 3B may be performed, in one embodiment, by a processing device executing program instructions contained within the benchmark utility 195 and (optionally) the workload optimization module 198 shown, for example, in FIG. 1.

In one embodiment, method 300 may begin by starting a benchmark utility used to obtain optimal in-game settings for a video game application (in step 305) and detecting a target FPS selected for the video game application (in step 310). As noted above, the target FPS may be selected by a video game user (or the video game application) based on the video game application and/or the capabilities of various hardware components (e.g., the CPU, GPU, monitor, etc.) included within the video game user's system.

In step 315, method 300 determines the in-game settings associated with the video game application detected in step 305. As noted above, common in-game settings include, but are not limited to, lighting/shadows, textures, resolution, antialiasing (AA), anisotropic filtering (AF), field of view, foliage, etc. However, each video game application has its own in-game settings, its own engine, and its own application program interface (API). As such, it is important to determine the in-game settings used for a particular video game application. Each in-game setting comprises a range of in-game setting values over which a particular setting may be adjusted. For example, a resolution setting may be adjusted over a plurality of resolution values ranging from low resolution to high resolution. Other in-game settings may be similarly adjusted over a plurality of in-game setting values ranging from low to high.

For each in-game setting determined in step 315, method 300 divides the range of in-game setting values into a plurality of subsets ranging from a lowest subset to a highest subset, and beginning with the lowest subset, assigns an increasingly greater numerical value to each subsequent subset (in step 320). In one example, the plurality of resolution values associated with the resolution setting may be divided into five subsets corresponding to very low resolution (e.g., 1280×1024), low resolution (e.g., 1366× 768), medium resolution (e.g., 1920×1080), high resolution (e.g., 2560×1440) and very high resolution (e.g., 3840× 2160). Other in-game settings may be similarly divided into a plurality of subsets. Although five subsets are discussed herein as an example, the in-game setting values may be divided into a fewer or greater number of subsets in other embodiments.

Once in-game setting values are divided into a plurality of subsets, an increasingly greater numerical value may be assigned to each subsequent subset (in step 320). In one embodiment, increasingly greater numerical values ranging between about 1 and 10 may be applied to each of the plurality of subsets. Continuing the resolution setting example discussed above, for example, '1' may be assigned to the very low resolution subset, '3' may be assigned to the low resolution subset, '5' may be assigned to the medium resolution subset, '7' may be assigned to the high resolution subset and '9' may be assigned to the very high resolution subset (in step 320). Although odd values ranging from 1 to 10 are provided herein as an example, other numerical values (e.g., even values or numerical values within a substantially different range) may be applied to each of the plurality of subsets in other embodiments.

In step 325, method 300 runs a benchmark test for the video game application to determine the optimal in-game settings for the video game application detected in step 305 and the target FPS detected in step 310. One embodiment of method steps associated with running the benchmark test and obtaining the optimal in-game settings is shown in FIG. 3B and discussed in more detail below. After the optimal in-game settings are obtained, the optimal in-game settings may be applied to the video game application (in step 330).

As shown in FIG. 3B, the benchmark test run in step 325 may generally begin by applying one subset of each of the in-game settings to the video game application (in step 335). In one embodiment, the median (or medium) subset of each in-game setting may be initially applied in step 335. In the example provided above, the median (or medium) subset of each in-game setting may be assigned a numerical value of '5'. Other numerical values may be assigned to the median subset in other embodiments. In step 340, method 300 monitors the system workload and the FPS generated during execution of the video game application.

In step 345, method 300 calculates a game variable score for the applied in-game settings (in this case, the median or medium subset of each in-game setting) by multiplying the generated FPS with a summation of the numerical values assigned to each subset of the applied in-game settings. For example, if six in-game settings are applied in step 335 and the generated FPS monitored in step 340 is 65 FPS, the game variable score calculated in step 345 would be: 65 x (5+5+5+5+5+5)=1950. Although a particular game variable score is provided as an example, other game variable scores may be calculated in step 345 depending on the number of in-game settings applied in step 335, the generated FPS monitored in step 340, and the numerical value assigned to each subset of the applied in-game settings in step 345.

In step 350, method 300 stores the in-game settings applied in step 335, the system workload and the generated FPS monitored in step 340, and the game variable score calculated in step 345 in a local database. In steps 355 and 360, method 300 compares the generated FPS to the target FPS. If the generated FPS is greater than the target FPS (YES branch of step 355), method 300 adjusts the applied in-game settings incrementally, one at a time, by increasing one in-game setting to the subset having the next highest numerical value (in step 365). In one example, the applied in-game settings may be adjusted in step 365 by increasing the resolution setting from the medium resolution subset (which is assigned a numerical value of '5') to the high resolution subset (which is assigned a numerical value of '7'). Although the resolution setting is provided herein as an example, another in-game setting (e.g., lighting/shadows, textures, antialiasing (AA), anisotropic filtering (AF), field of view, foliage, etc.) may alternatively be increased in step 365. Once an in-game setting is increased to the subset having the next highest numerical value (in step 365), method 300 continues to execute the video game application using the adjusted in-game settings (in step 370) to determine the effect, if any, the new in-game settings have on the visual quality of the game and the generated FPS.

If the generated FPS is less than the target FPS (NO branch of step 355 and YES branch of step 360), method 300 adjusts the applied in-game settings incrementally, one at a time, by decreasing one in-game setting to the subset having the next lowest numerical value (in step 375). In one example, the applied in-game settings may be adjusted in step 375 by decreasing the resolution setting from the medium resolution subset (which is assigned a numerical value of '5') to the low resolution subset (which is assigned a numerical value of '3'). Although the resolution setting is provided herein as an example, another in-game setting (e.g., lighting/shadows, textures, antialiasing (AA), anisotropic filtering (AF), field of view, foliage, etc.) may alternatively be decreased in step 375. Once an in-game setting is decreased to the subset having the next lowest numerical value (in step 375), method 300 continues to execute the video game application using the adjusted in-game settings (in step 370) to determine the effect, if any, the new in-game settings have on the visual quality of the game and the generated FPS.

After the applied in-game settings are adjusted (in step 365 or step 375) and the video game application is executed using the adjusted in-game settings (in step 370), method 300 returns to step 340 to run the benchmark test again using the adjusted in-game settings. More specifically, method 300 iteratively repeats steps 340, 345, 350, 355, 360, 365, 370 and 375, adjusting one in-game setting at a time (either up to the next highest subset or down to the next lowest subset), until the generated FPS equals the target FPS (NO branch of step 355 and NO branch of step 360). Each time the benchmark test is run with a new set of in-game settings, a new game variable score is calculated (in step 345) and stored in the local database (in step 350) along with the applied in-game settings and the system workload and FPS generated when the in-game settings were applied. As a result of this iterative process, a plurality of game variable scores is stored in the local database, wherein each game variable score is associated with a particular set of in-game settings, and the system workload and FPS generated when that particular set of in-game settings was applied.

Once the generated FPS equals the target FPS, method 300 determines the optimal in-game settings for the video game application and the target FPS by selecting, from the local database, the in-game settings having the highest game variable score (in step 380). Once the optimal in-game settings are determined (in step 380), the optimal in-game settings are applied to the video game application (in step 330), as discussed above with reference to FIG. 3A.

FIG. 4 illustrates one embodiment of a method 400 that may be used to optimize the visual quality of a video game application during a gaming session. Although not strictly limited to such, the method 400 shown in FIG. 4 may be performed, in one embodiment, by a processing device executing program instructions contained within the game optimization module 197 and (optionally) the workload optimization module 198 shown, for example, in FIG. 1.

In one embodiment, method 400 may begin upon detecting the beginning of a gaming session for a video game application (in step 405) and detecting a target FPS selected for the video game application (in step 410). As noted above, the target FPS may be selected by a video game user (or the video game application) based on the video game application and/or the capabilities of various hardware components (e.g., the CPU, GPU, monitor, etc.) included within the video game user's system.

In step 415, method 400 reads a local database to determine optimal in-game settings for the video game application and the target FPS. As described above with respect to FIG. 3B, the local database may store a plurality of game variable scores along with corresponding in-game settings, and the system workload and FPS generated when the in-game settings were applied. To determine the optimal in-game settings (in step 415), method 400 may select the in-game settings associated with the highest game variable score stored within the local database.

In some embodiments, method 400 may monitor the system workload and may optimize one or more system components to achieve a maximum FPS at the current system workload (in optional step 425). In one embodiment, the workload optimization module 198 shown in FIG. 1 may be utilized in step 425. As noted above, the workload optimization module 198 may be used to dynamically adjust operating characteristics of one or more system components (e.g., the CPU, GPU, monitor, RAM, network, power, fans, skin temperature, etc.) during a gaming session, if needed, to achieve a maximum FPS for the video game application at the current system workload. In other embodiments, step 425 may be omitted and method 400 may continue on to step 430.

Method 400 monitors the FPS generated during the gaming session (in step 430) and compares the generated FPS to the target FPS (in step 435). If the generated FPS is less than the target FPS (YES branch of step 435), method 400 adjusts each setting of the applied in-game settings, one setting at a time, until the generated FPS equals the target FPS (in step 440). In step 445, method 400 stores the new in-game settings in the local database and applies the new in-game settings to the video game application. In step 450, method 400 determines whether or not a gaming session for the video game application has ended. If the gaming session has not yet ended (NO branch of step 450), method 400 repeats steps 430, 435, 440, 445 and 450 until the gaming session ends (YES branch of step 450). Once the gaming session ends, method 400 ends.

As noted above, FIGS. 2-4 provide various embodiments of methods for monitoring and optimizing the FPS generated during execution of the video game application (FIG. 2), determining optimal in-game settings for a video game application (FIGS. 3A-3B), and optimizing the visual quality of a video game application during a gaming session (FIG. 4). It will be recognized that the methods 200, 300 and 400 shown in FIGS. 2-4 are merely exemplary and additional methods may utilize the techniques described herein. For example, although the methods shown and described herein are applied to video game applications, similar methods may be used to determining optimal settings and optimizing the visual quality of any graphical application. In is further recognized that additional steps may be added to the methods shown in FIGS. 2-4, as the steps described are not intended to be exclusive. Moreover, the order of the steps is not limited to the order shown in the FIGS. 2-4, as different orders may occur and/or various steps may be performed in combination or at the same time.

As noted above, the methods shown in FIGS. 2-4 are computer implemented methods. As such, it will be understood that one or more of the tasks, functions, or methodologies described herein (e.g., including those described herein for components 174, 195, 196, 197, 198, 200, 300 and 400, etc.) may be implemented by a computer program of instructions (e.g., computer readable code such as application code, firmware code or software code) embodied in a non-transitory tangible computer readable medium (e.g., optical disk, magnetic disk, non-volatile memory device, non-volatile storage device, etc.), in which the computer program comprising instructions is configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of a CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random access memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a dedicated gaming console, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus, the invention is not limited to only those combinations shown herein, but rather may include other combinations.

What is claimed is:

1. A computer-implemented method performed by a processing device of an information handling system (IHS) to determine optimal in-game settings for a video game application executed by the IHS or another IHS remotely coupled to the IHS, the computer-implemented method comprising:

detecting a target frames-per-second (FPS) selected for the video game application;

determining in-game settings associated with the video game application, wherein each in-game setting comprises a range of in-game setting values, and wherein for each in-game setting, the computer-implemented method further comprises:

dividing the range of in-game setting values into a plurality of subsets ranging from a lowest subset to a highest subset; and beginning with the lowest subset, assigning an increasingly greater numerical value to each subsequent subset; and determining the optimal in-game settings for the video game application and the target FPS.

2. The computer-implemented method of claim 1, further comprising applying the optimal in-game settings to the video game application.

3. The computer-implemented method of claim 1, wherein determining the optimal in-game settings for the video game application and the target FPS comprises:
   applying one subset of each of the in-game settings to the video game application;
   monitoring the frames-per-second (FPS) generated during execution of the video game application; and
   combining the generated FPS and the numerical values assigned to the applied subsets of n-game settings into a game variable score for the applied subsets of in-game settings.

4. The computer-implemented method of claim 3, wherein a median subset of each of the in-game settings is initially applied to the video game application in said applying.

5. The computer-implemented method of claim 3, wherein combining the generated FPS and the numerical values assigned to the applied subsets of in-game settings into a game variable score comprises:
   calculating the game variable score by multiplying the generated FPS with a summation of the numerical values assigned to the applied subsets of the in-game settings.

6. The computer-implemented method of claim 3, wherein determining the optimal in-game settings for the video game application and the target FPS further comprises:
   storing the applied subsets of in-game settings, the generated FPS and the game variable score in a local database.

7. The computer-implemented method of claim 6, wherein determining the optimal in-game settings for the video game application and the target FPS further comprises:
   comparing the generated FPS to the target FPS;
   adjusting the applied subsets of in-game settings by increasing one in-game setting to the subset having the next highest numerical value, if the generated FPS is greater than the target FPS; and
   adjusting the applied subsets of in-game settings by decreasing one in-game setting to the subset having the next lowest numerical value, if the generated FPS is less than the target FPS.

8. The computer-implemented method of claim 7, wherein determining the optimal in-game settings for the video game application and the target FPS further comprises:
   applying the adjusted subsets of the in-game settings to the video game application; and
   repeating the steps of monitoring, combining, storing and comparing until the generated FPS equals the target FPS.

9. The computer-implemented method of claim 8, wherein determining the optimal in-game settings for the video game application and the target FPS further comprises:
   determining the optimal in-game settings for the video game application and the target FPS by selecting, from the local database, the in-game settings associated with the highest game variable score.

10. A computer-implemented method performed by a processing device of an information handling system (IHS) to optimize the visual quality of a video game application during a gaming session, the computer-implemented method comprising:
   detecting the beginning of a gaming session for the video game application;
   detecting a target frames-per-second (FPS) selected for the video game application;
   determining optimal in-game settings for the video game application and the target FPS;
   applying the optimal in-game settings to the video game application;
   monitoring the FPS generated during the gaming session; and
   comparing the generated FPS to the target FPS, wherein if the generated FPS is less than the target FPS, the computer-implemented method further comprises:
      adjusting each setting of the applied in-game settings, one setting at a time, until the generated FPS equals the target FPS to optimize the visual quality of the video game application during the gaming session.

11. The computer-implemented method of claim 10, wherein determining optimal in-game settings for the video game application and the target FPS comprises:
   accessing a local database storing a plurality of game variable scores, wherein each game variable score is associated with a different set of in-game settings and the FPS generated when the different set of in-game settings was previously applied to the video game application; and
   selecting, from the local database, the set of in-game settings associated with the highest game variable score.

12. The computer-implemented method of claim 10, wherein after adjusting each setting of the applied in-game settings, the computer-implemented method further comprises:
   storing the adjusted in-game settings in a local database;
   applying the adjusted in-game settings to the video game application; and
   repeating the steps of monitoring and comparing until the gaming session ends.

13. An information handling system (IHS), comprising:
   a computer readable medium configured to store a first set of program instructions executable to determine optimal in-game settings for a video game application executed by the IHS, or another IHS remotely coupled to the IHS; and
   a processing device coupled to the computer readable medium and configured to execute the first set of program instructions to:
      detect a target frames-per-second (FPS) selected for the video game application;
      determine in-game settings associated with the video game application, wherein each in-game setting comprises a range of in-game setting values;
      for each in-game setting, divide the range of in-game setting values into a plurality of subsets ranging from a lowest subset to a highest subset, and beginning with the lowest subset, assign an increasingly greater numerical value to each subsequent subset; and
      determine the optimal in-game settings for the video game application and the target FPS.

14. The information handling system of claim 13, wherein to determine the optimal in-game settings for the video game application and the target FPS, the processing device is configured to execute the first set of program instructions to:

apply one subset of each of the in-game settings to the video game application;
monitor the frames-per-second (FPS) generated during execution of the video game application;
combine the generated FPS and the numerical values assigned to the applied subsets of in-game settings into a game variable score for the applied subsets of in-game settings; and
store the applied subsets of in-game settings, the generated FPS and the game variable score in a local database.

15. The information handling system of claim 14, wherein to determine the optimal in-game settings for the video game application and the target FPS, the processing device is configured to execute the first set of program instructions to:
compare the generated FPS to the target FPS;
adjust the applied subsets of in-game settings by increasing one in-game setting to the subset having the next highest numerical value, if the generated FPS is greater than the target FPS; and
adjust the applied subsets of in-game settings by decreasing one in-game setting to the subset having the next lowest numerical value, if the generated FPS is less than the target FPS.

16. The information handling system of claim 15, wherein to determine the optimal in-game settings for the video game application and the target FPS, the processing device is configured to execute the first set of program instructions to:
apply the adjusted subsets of the in-game settings to the video game application; and
repeat said monitoring, combining, storing and comparing until the generated FPS equals the target FPS.

17. The information handling system of claim 16, wherein to determine the optimal in-game settings for the video game application and the target FPS, the processing device is configured to execute the first set of program instructions to:
determine the optimal in-game settings for the video game application and the target FPS by selecting, from the local database, the in-game settings associated with the highest game variable score.

18. The information handling system of claim 13, wherein the first set of program instructions are executed by the processing device before, during or after a video game user begins a gaming session with the video game application.

19. The information handling system of claim 13, wherein:
the computer readable medium is configured to store a second set of program instructions executable to optimize the visual quality of the video game application during a gaming session; and
the processing device is configured to execute the second set of program instructions to:
detect the beginning of a gaming session for the video game application;
detect the target FPS selected for the video game application;
determine the optimal in-game settings for the video game application and the target FPS;
apply the optimal in-game settings to the video game application;
monitor the FPS generated during the gaming session; and
compare the generated FPS to the target FPS, wherein if the generated FPS is less than the target FPS, the processing device is configured to execute the second set of program instructions to:
adjust each setting of the applied in-game settings, one setting at a time, until the generated FPS equals the target FPS to optimize the visual quality of the video game application during the gaming session.

20. The information handling system of claim 19, wherein to determine the optimal in-game settings for the video game application and the target FPS, the processing device is configured to execute the second set of program instructions to:
access a local database storing a plurality of game variable scores, wherein each game variable score is associated with a different set of in-game settings and the FPS generated when the different set of in-game settings was previously applied to the video game application; and
select, from the local database, the set of in-game settings associated with the highest game variable score.

21. The information handling system of claim 19, wherein after adjusting each setting of the applied in-game settings, the processing device is configured to execute the second set of program instructions to:
store the adjusted in-game settings in a local database;
apply the adjusted in-game settings to the video game application; and
repeat said monitoring and comparing until the gaming session ends.

* * * * *